(12) United States Patent
Fukuhara

(10) Patent No.: US 11,649,313 B2
(45) Date of Patent: May 16, 2023

(54) POLYVINYL ALCOHOL COMPOSITION, USE OF SAME, AND METHOD FOR PRODUCING VINYL RESIN

(71) Applicant: KURARAY CO., LTD., Kurashiki (JP)

(72) Inventor: Tadahito Fukuhara, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 406 days.

(21) Appl. No.: 17/046,612

(22) PCT Filed: Apr. 10, 2019

(86) PCT No.: PCT/JP2019/015612
§ 371 (c)(1),
(2) Date: Oct. 9, 2020

(87) PCT Pub. No.: WO2019/198754
PCT Pub. Date: Oct. 17, 2019

(65) Prior Publication Data
US 2021/0163654 A1 Jun. 3, 2021

(30) Foreign Application Priority Data

Apr. 11, 2018 (JP) .............................. JP2018-076449

(51) Int. Cl.
*C08F 290/12* (2006.01)
*C08F 261/04* (2006.01)
*C08L 27/06* (2006.01)

(52) U.S. Cl.
CPC .......... *C08F 290/12* (2013.01); *C08F 261/04* (2013.01); *C08L 27/06* (2013.01)

(58) Field of Classification Search
CPC ...... C08L 29/04; C08F 216/06; C08F 218/08; C08F 218/10; C08F 290/12; C08F 261/04; C08F 8/14
See application file for complete search history.

(56) References Cited

U.S. PATENT DOCUMENTS

| | | | |
|---|---|---|---|
| 4,540,743 A | 9/1985 | Schulz et al. | |
| 2009/0111940 A1 | 4/2009 | Kato et al. | |
| 2009/0324836 A1 | 12/2009 | Tsurugi et al. | |
| 2017/0198068 A1 | 7/2017 | Kozuka et al. | |

FOREIGN PATENT DOCUMENTS

| | | |
|---|---|---|
| JP | 60-13803 A | 1/1985 |
| JP | 2007-321099 A | 12/2007 |
| WO | WO 2007/119735 A1 | 10/2007 |
| WO | WO 2015/182567 A1 | 12/2015 |

OTHER PUBLICATIONS

International Search Report dated Jun. 18, 2019 in PCT/JP2019/015612 filed on Apr. 10, 2019, 2 pages.

*Primary Examiner* — Mark S Kaucher
(74) *Attorney, Agent, or Firm* — Oblon, McClelland, Maier & Neustadt, L.L.P.

(57) ABSTRACT

A composition containing: modified polyvinyl alcohol; and unsaturated monocarboxylic acid or a salt thereof, wherein the modified polyvinyl alcohol has a viscosity-average degree of polymerization of from 400 to 3500, has a degree of saponification of from 68 mol % to 99.9 mol %, and contains from 0.01 mol % to 1.50 mol % of an acryloyl group or a methacryloyl group in a side chain, the unsaturated monocarboxylic acid or a salt thereof is at least one selected from the group consisting of acrylic acid, methacrylic acid, sodium acrylate, and sodium methacrylate, and in the composition, a mass ratio of the modified polyvinyl alcohol/the unsaturated monocarboxylic acid or a salt thereof is from 82/18 to 99.9/0.1. The composition is thus provided that is excellent in water solubility and storage stability and polymerization stability of a vinyl compound and contains the modified polyvinyl alcohol.

6 Claims, No Drawings

POLYVINYL ALCOHOL COMPOSITION, USE OF SAME, AND METHOD FOR PRODUCING VINYL RESIN

TECHNICAL FIELD

The present invention relates to a composition (D) containing modified polyvinyl alcohol (A) and unsaturated monocarboxylic acid or a salt thereof (B). The present invention also relates to a dispersion stabilizer for suspension polymerization of a vinyl compound containing the composition (D) and to a method of producing a vinyl-based resin.

BACKGROUND ART

Polyvinyl alcohol (hereinafter, may be abbreviated as "PVA") has been conventionally used for various products and applications, such as dispersion stabilizers for suspension polymerization of vinyl compounds, coating agents, adhesives, polarizing films, water soluble films, pharmaceuticals, and cosmetics. The presence of a reactive group, such as a double bond, in PVA is known to improve various types of performance or exhibit a specific effect.

Due to the high reactivity of the double bond, long-term storage of PVA has a risk of gelation by the reaction of the double bond. Compared with the case of using PVA immediately after production, such long-term storage may thus cause various types of performance to be poor or clogging of piping and the like with the gel when used as an aqueous PVA solution to impair the productivity. Such PVA with a double bond causes a decrease in solubility in water and may thus be not applicable to applications requiring water solubility.

Applications of PVA requiring storage stability and water solubility include dispersion stabilizers for suspension polymerization of vinyl compounds. Use of PVA with a double bond as a dispersion stabilizer for suspension polymerization of a vinyl compound allows stable polymerization reaction of the vinyl compound (Patent Documents 1 and 2).

Patent Document 1 describes a dispersion stabilizer for suspension polymerization containing a polyvinyl alcohol-based polymer with double bonds in side chains obtained by acetalizing a polyvinyl alcohol-based polymer with monoaldehyde containing an olefin-based unsaturated double bond.

Patent Document 2 describes a dispersion stabilizer of a polyvinyl alcohol-based polymer with double bonds in side chains obtained by esterifying a polyvinyl alcohol-based polymer with carboxylic acid containing an unsaturated double bond or a salt thereof.

However, suspension polymerization of a vinyl compound using such a dispersion stabilizer does not exhibit a satisfactory effect of polymerization stability. In addition, storage stability of the dispersion stabilizer is not considered sufficient. The polymerization stability herein means a property of obtaining vinyl-based resin particles with a uniform diameter by suppressing particle coarsening as a result of good dispersibility of vinyl compound droplets during suspension polymerization.

PRIOR ART DOCUMENT

Patent Document

Patent Document 1: WO 2015/182567 A1
Patent Document 2: WO 2007/119735 A1

SUMMARY OF THE INVENTION

Problems to be Solved by the Invention

The present invention has been made to solve the above problems, and it is an object thereof to provide a composition containing polyvinyl alcohol excellent in water solubility and storage stability. It is also an object thereof to provide a dispersion stabilizer for suspension polymerization exhibiting very high polymerization stability when suspension-polymerizing a vinyl compound and also to provide a vinyl-based resin having a small average particle diameter, having fewer coarse particles produced therein, and suppressing formation of fish eyes.

Means for Solving the Problems

The above problems are solved by providing a composition (D) comprising: modified polyvinyl alcohol (A); and unsaturated monocarboxylic acid or a salt thereof (B), wherein the modified polyvinyl alcohol (A) has a viscosity-average degree of polymerization of 400 or more and 3500 or less, has a degree of saponification of 68 mol % or more and 99.9 mol % or less, and contains 0.01 mol % or more and 1.50 mol % or less of an acryloyl group or a methacryloyl group in a side chain, the unsaturated monocarboxylic acid or a salt thereof (B) is at least one selected from the group consisting of acrylic acid, methacrylic acid, sodium acrylate, and sodium methacrylate, and in the composition (D), a mass ratio of the modified polyvinyl alcohol (A)/the unsaturated monocarboxylic acid or a salt thereof (B) is from 82/18 to 99.9/0.1.

A preferred embodiment of the present invention is the composition (D), wherein the modified polyvinyl alcohol (A) contains a methacryloyl group in a side chain.

Another preferred embodiment of the present invention is the composition (D), wherein the unsaturated monocarboxylic acid or a salt thereof (B) is methacrylic acid or sodium methacrylate.

Another preferred embodiment of the present invention is the composition (D), further comprising a compound (C) being at least one selected from the group consisting of: a compound containing a conjugated double bond and containing two or more hydroxyl groups bonded to a carbon atom constituting the conjugated double bond, a salt thereof, or an oxide thereof (C1); alkoxyphenol (C2); and a cyclic nitroxyl radical (C3).

Another preferred embodiment of the present invention is a dispersion stabilizer for suspension polymerization of a vinyl compound comprising the composition (D).

Another preferred embodiment of the present invention is a method of producing a vinyl-based resin comprising a step of suspension-polymerizing a vinyl compound in the presence of the composition (D).

Effects of the Invention

The composition (D) of the present invention is excellent in water solubility and storage stability. In addition, use of the dispersion stabilizer for suspension polymerization containing the composition (D) provides a vinyl-based resin exhibiting very high polymerization stability when suspension-polymerizing a vinyl compound, having a small average particle diameter, having fewer coarse particles produced therein, and suppressing formation of fish eyes.

MODES FOR CARRYING OUT THE INVENTION

[Composition (D)]

A composition (D) of the present invention is characterized by comprising specific amounts of: modified polyvinyl alcohol (A) (hereinafter, may be referred to as "modified PVA (A)") having a viscosity-average degree of polymerization and a degree of saponification both in specific ranges and containing an acryloyl group or a methacryloyl group in a side chain; and unsaturated monocarboxylic acid or a salt thereof (B).

In the composition (D), a mass ratio of the modified PVA (A)/the unsaturated monocarboxylic acid or a salt thereof (B) is from 82/18 to 99.9/0.1. As clearly seen from comparison between Examples and Comparative Examples described later, the case of the mass ratio of less than 82/18 causes storage stability not to be good, and when the composition (D) is used as a dispersion stabilizer for suspension polymerization of a vinyl compound, causes a vinyl chloride polymer to have a large particle diameter, a wide particle size distribution, and formation of more fish eyes. It is thus important that the mass ratio is from 82/18 to 99.9/0.1. The mass ratio is preferably from 90/10 to 99.8/0.2 and more preferably from 92/8 to 99.7/0.3.

[Method of Producing Composition (D)]

The composition (D) in the present invention contains the modified PVA (A) and the unsaturated monocarboxylic acid or a salt thereof (B), which is at least one selected from the group consisting of acrylic acid, methacrylic acid, sodium acrylate, and sodium methacrylate. Examples of the method of producing the composition (D) may include, but not particularly limited to, (i) a method comprising reacting polyvinyl alcohol (E) with unsaturated carboxylic acid or a derivative thereof as an esterification agent in the presence of the unsaturated monocarboxylic acid or a salt thereof (B) and (ii) a method comprising reacting the polyvinyl alcohol (E) with the unsaturated carboxylic acid or a derivative thereof as an esterification agent, followed by adding the unsaturated monocarboxylic acid or a salt thereof (B). When the polyvinyl alcohol (E) reacts with the esterification agent, it is preferred to heat for reaction acceleration. The heating temperature is preferably from 80° C. to 180° C. The heating time is appropriately set in relation to the heating temperature, and generally, from 10 minutes to 24 hours. In this context, the polyvinyl alcohol (E) is PVA with no double bonds in side chains (hereinafter, may be referred to as "PVA (E)").

The method of causing the PVA (E) to react with the unsaturated carboxylic acid or a derivative thereof as the esterification agent is preferably a method comprising obtaining a solution by dissolving the unsaturated carboxylic acid or a derivative thereof in a solvent, and then adding PVA (E) powder to the solution for swelling, followed by obtaining mixed powder by removing the solvent and heating the mixed powder thus obtained. Reaction in a swollen state or a dissolved state sometimes causes a problem such as slow reaction proceedings and side reaction. In such a manner, the reaction in the solid state in the presence of the unsaturated carboxylic acid or a derivative thereof as the esterification agent allows proceedings of esterification reaction while suppressing undesirable crosslinking reaction proceedings. This reaction method allows production of the modified PVA (A) and thus powder of the composition (D) by mixing with the unsaturated monocarboxylic acid or a salt thereof (B). The solvent to dissolve the esterification agent to be used includes: alcohols, such as methanol, ethanol, and propanol; water, methyl acetate, and the like. The solvent may be removed by heating or decompressing.

In the above reaction method, the esterification agent content in the mixed powder before heating is preferably 0.01 parts by mass or more based on 100 parts by mass of the PVA (E), more preferably 0.1 parts by mass or more, and particularly preferably 0.5 parts by mass or more. Meanwhile, the esterification agent content in the mixed powder before heating is preferably 40 parts by mass or less based on 100 parts by mass of the PVA (E), more preferably 20 parts by mass or less, even more preferably 10 parts by mass or less, and particularly preferably 7 parts by mass or less.

The form of the composition (D) is preferably, but not particularly limited to, powder from the perspective of the rate of dissolution in water. The powder in this situation generally has a particle diameter from 50 to 2000 μm. The particle diameter of the powder is an average particle diameter obtained by the method of JIS-K6726: 1994.

[Modified PVA (A)]

The modified PVA (A) is synthesized by causing the PVA (E) to react with the esterification agent and the PVA (E) may be produced by polymerizing a vinyl ester-based monomer, employing a conventionally known method, such as bulk polymerization, solution polymerization, suspension polymerization, emulsion polymerization, and dispersion polymerization. Preferred polymerization methods from an industrial perspective include solution polymerization, emulsion polymerization, and dispersion polymerization. For polymerization operation, it is possible to employ any mode of polymerization of a batch method, a semi-batch method, and a continuous method.

Examples of the vinyl ester-based monomer to be used for the polymerization may include vinyl acetate, vinyl formate, vinyl propionate, vinyl caprylate, vinyl versatate, and the like. Among them, vinyl acetate is preferred from an industrial perspective.

Upon polymerization of the vinyl ester-based monomer, the vinyl ester-based monomer may be copolymerized with another monomer without impairing the spirit of the present invention. Examples of the monomer allowed for use may include: α-olefins, such as ethylene, propylene, n-butene, and isobutylene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; acrylamide derivatives, such as N-methylacrylamide, N-ethylacrylamide, N,N-dimethylacrylamide, diacetoneacrylamide, acrylamide propane sulfonic acid and salts thereof, acrylamidopropyl dimethylamine and salts thereof or quaternary salts thereof, and N-methylolacrylamide and derivatives thereof; methacrylamide; methacrylamide derivatives, such as N-methylmethacrylamide, N-ethylmethacrylamide, methacrylamide propane sulfonic acid and salts thereof, methacrylamidopropyl dimethylamine and salts thereof or quaternary salts thereof, N-methylolmethacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate and allyl chloride; unsaturated dicarboxylic acids, such as maleic acid, itaconic acid, and fumaric acid, and salts thereof or esters thereof; vinylsilyl compounds, such as vinyltrimethoxysilane; isopropenyl acetates; and the like. The amount of such another copolymerized monomer is generally 10 mol % or less.

In addition, polymerization of the vinyl ester-based monomer may be carried out in the presence of a chain transfer agent for the purposes of adjusting the degree of polymerization of polyvinyl ester to be obtained and the like. Examples of the chain transfer agent may include aldehydes, such as acetaldehyde, propionaldehyde, butylaldehyde, and benzaldehyde; ketones, such as acetone, methylethylketone, hexanone, and cyclohexanone; mercaptans, such as 2-hydroxyethanethiol and dodecyl mercaptan; and hydrocarbon halides, such as trichloroethylene and perchloroethylene, and among them, aldehydes and ketones are used preferably. Although the amount of the added chain transfer agent is determined in accordance with the chain transfer constant of the chain transfer agent to be added and the degree of polymerization of the intended polyvinyl ester, it is desirably from 0.1 to 10 mass % relative to the vinyl ester-based monomer in general.

To saponification reaction of the polyvinyl ester, a conventionally known alcoholysis or hydrolysis reaction is applicable that uses a basic catalyst, such as sodium hydroxide, potassium hydroxide, and sodium methoxide, or an acidic catalyst, such as p-toluenesulfonic acid. Examples of the solvent used for the saponification reaction may include: alcohols, such as methanol and ethanol; esters, such as methyl acetate and ethyl acetate; ketones, such as acetone and methylethylketone; and aromatic hydrocarbons, such as benzene and toluene, and one type of them may be used singly or two or more types of them may be used together. Among them, it is convenient and preferred to carry out the saponification reaction using methanol or a mixed solution of methanol and methyl acetate as a solvent in the presence of sodium hydroxide as a basic catalyst.

It is important that the modified PVA (A) contains 0.01 mol % or more and 1.50 mol % or less of an acryloyl group or a methacryloyl group in a side chain. The amount of modification by the acryloyl group or the methacryloyl group (hereinafter, may be abbreviated as an "amount of introduced modification groups") may be obtained from the content of the double bonds in the acryloyl group or the methacryloyl group. The double bond means a carbon-carbon double bond. Suspension polymerization of a vinyl compound using the dispersion stabilizer for suspension polymerization containing the modified PVA (A) with the amount of introduced modification groups of less than 0.01 mol % causes a decrease in polymerization stability to produce many coarse particles or to obtain a vinyl-based resin with many fish eyes. The amount of introduced modification groups is preferably 0.03 mol % or more. The amount of introduced modification groups more than 1.50 mol % causes the storage stability not to be good, and moreover use of the composition (D) as the dispersion stabilizer for suspension polymerization of a vinyl compound causes a vinyl-based resin to be obtained to have a large particle diameter, a wide particle size distribution, and formation of more fish eyes. The amount of introduced modification groups is preferably 1.3 mol % or less and more preferably 1 mol % or less.

It is important that the double bonds contained in side chains of the modified PVA (A) is an acryloyl group or a methacryloyl group, and among them, a methacryloyl group is preferred. Other functional groups containing a double bond cause a decrease in stability of the aqueous solution or a decrease in performance when used as the dispersion stabilizer for suspension polymerization of a vinyl compound.

The amount of introduced modification groups, that is, the content of the double bonds in the modified PVA (A) may be measured by known methods. Specifically, measurement by $^1$H-NMR is convenient. Examples of the method of measuring the amount of introduced modification groups in the modified PVA (A) may include a method comprising washing the modified PVA (A) with a solution not dissolving the modified PVA (A) and then measuring. In particular, a convenient and preferable method is a reprecipitation method, where an aqueous solution of the modified PVA (A) with a concentration approximately from 1 to 20 mass is once prepared, followed by dropping of the aqueous solution into a solution not dissolving the modified PVA (A) to precipitate the modified PVA (A) for washing.

Examples of the unsaturated carboxylic acid or a derivative thereof used for esterification of the PVA (E) may include acrylic acid or salts thereof, methacrylic acid or salts thereof, methacrylic anhydride, acrylic anhydride, acrylic acid alkyl ester, and methacrylic acid alkyl ester. One type of the unsaturated carboxylic acid or a derivative thereof may be used singly or two or more types of them may be used together.

Among them, from the perspective of various applications and performances when formed into the modified PVA (A), the unsaturated carboxylic acid or a derivative thereof is preferably acrylic anhydride or methacrylic anhydride and more preferably, from the perspective of availability, methacrylic anhydride.

The modified polyvinyl alcohol (A) has a viscosity-average degree of polymerization of 400 or more. From the perspective of productivity, the viscosity-average degree of polymerization is preferably 500 or more. For use as the dispersion stabilizer for suspension polymerization of a vinyl compound, the modified PVA (A) more preferably has a viscosity-average degree of polymerization of 600 or more. Meanwhile, the modified PVA (A) has a viscosity-average degree of polymerization of 3500 or less and preferably 2500 or less. For use as the dispersion stabilizer for suspension polymerization of a vinyl compound, the modified PVA (A) more preferably has a viscosity-average degree of polymerization of 2000 or less, even more preferably 1500 or less, and particularly preferably 1000 or less. The viscosity-average degree of polymerization is a value obtained by measurement in accordance with JIS-K 6726: 1994. Specifically, when the degree of saponification is less than 99.5 mol %, the PVA is saponified to have a degree of saponification of 99.5 mol % or more and the viscosity-average degree of polymerization (P) is obtained by an equation below using the limiting viscosity [η] (liter/g) measured at 30° C. in water.

$$P=([\eta]\times 10^4/8.29)^{(1/0.62)}$$

The modified PVA (A) has a degree of saponification of 68 mol % or more. A degree of saponification of less than 68 mol % causes a decrease in solubility of the modified PVA (A) in water. Use of the composition (D) as the dispersion stabilizer for suspension polymerization of a vinyl compound causes a vinyl chloride polymer to have a large particle diameter, a wide particle size distribution, and formation of more fish eyes. Meanwhile, the modified PVA (A) generally has a degree of saponification of 99.9 mol % or less. It is difficult to produce modified PVA (A) having a degree of saponification of more than 99.9 mol %. For use as the dispersion stabilizer for suspension polymerization of a vinyl compound, the modified PVA (A) preferably has a degree of saponification of 97 mol % or less, more preferably 90 mol % or less, even more preferably 85 mol % or less, and particularly preferably 77 mol % or less. The degree of saponification is a value obtained by measurement in accordance with JIS-K6726: 1994.

[Unsaturated Monocarboxylic Acid or Salt Thereof (B)]

It is important that the composition (D) of the present invention comprises the unsaturated monocarboxylic acid or a salt thereof (B) being at least one selected from the group consisting of acrylic acid, methacrylic acid, sodium acrylate, and sodium methacrylate. Other unsaturated monocarboxylic acids or salts thereof cause a decrease in water solubility of the composition (D) or a decrease in stability of the aqueous solution, and use of the composition (D) as the dispersion stabilizer for suspension polymerization of a vinyl compound causes a vinyl-based resin to be obtained to have a large particle diameter, a wide particle size distribution, and formation of more fish eyes. The unsaturated monocarboxylic acid or a salt thereof (B) is preferably methacrylic acid or sodium methacrylate.

[Compound (C)]

The composition (D) of the present invention preferably further comprises a compound (C) being at least one selected from the group consisting of: a compound containing a conjugated double bond and containing two or more hydroxyl groups bonded to a carbon atom constituting the conjugated double bond, a salt thereof, or an oxide thereof (C1); alkoxyphenol (C2); and a cyclic nitroxyl radical (C3).

In the compound containing a conjugated double bond and containing two or more hydroxyl groups bonded to a carbon atom constituting the conjugated double bond, a salt thereof, or an oxide thereof (C1), the conjugated double bond defined herein includes conjugation with carbon-carbon double bonds, conjugation with carbon-heteroatom double bonds, and conjugation with aromatic compounds. Examples of the compound containing a conjugated double bond and containing two or more hydroxyl groups bonded to a carbon atom constituting the conjugated double bond, a salt thereof, or an oxide thereof (C1) to be used may include: catechol, t-butylhydroquinone, 2,6-di t-butylhydroquinone, pyrogallol, 1,3,5-trihydroxybenzene, and hexahydroxybenzene; gallic acid or salts thereof; gallic acid alkyl esters, such as methyl gallate, ethyl gallate, propyl gallate, octyl gallate, and dodecyl gallate; catechins, such as epicatechin, epigallocatechin, and epigallocatechin-3-gallate;

ascorbic acid or salts thereof; benzoquinone; dehydroascorbic acid; and the like. Among them, compounds containing a conjugated double bond and containing two or more hydroxyl groups bonded to a carbon atom constituting the conjugated double bond are preferred and compounds containing two or more phenolic hydroxyl groups are more preferred.

The alkoxyphenol (C2) in the present invention means a compound in which at least one hydrogen atom in a benzene ring is substituted with an alkoxy group and further at least one hydrogen atom is substituted with a hydroxyl group. Other hydrogen atoms may be substituted with an alkyl group, such as a methyl group and an ethyl group, or a halogen group, where the number and the bonding site are not limited. The alkoxy group generally has a carbon number of 10 or less, preferably 8 or less, more preferably 6 or less, even more preferably 4 or less, and particularly preferably 2 or less. The alkoxy group may have linear or branched carbon chains, and from the perspective of availability, linear carbon chains are preferred. Examples of the alkoxy group may include a methoxy group, an ethoxy group, a propoxy group, a butoxy group, and the like, and among them, a methoxy group is preferred.

The alkoxyphenol (C2) used in the present invention is preferably a compound in which one hydrogen atom in a benzene ring is substituted with an alkoxy group and further one hydrogen atom is substituted with a hydroxyl group. The bonding site of the alkoxy group in this situation is preferably, but not particularly limited to, an ortho position or a para position from the perspective of availability and more preferably a para position.

Examples of the alkoxyphenol (C2) preferably used in the present invention may include methoxyphenol, ethoxyphenol, propoxyphenol, butoxyphenol, and the like. Among them, from the perspective of availability, methoxyphenol is preferred.

The cyclic nitroxyl radical (C3) in the present invention means a compound containing a heterocycle formed from a carbon atom and a heteroatom, part of the heterocycle formed by a nitrogen atom in the nitroxyl radical (=N—O·). Examples of the heteroatom constituting the heterocycle may include, in addition to a nitrogen atom, an oxygen atom, a phosphorus atom, a sulfur atom, and the like. The number of atoms forming the heterocycle is generally five or six. To the atom forming the heterocycle, a substituent, such as an alkyl group, a hydroxyl group, a carboxyl group, a sulfo group and a halogen group, may be bonded. The number and the bonding sites of the substituents are not particularly limited, and a plurality of substituents may be bonded to an identical atom or different atoms. From the perspective of availability, the cyclic nitroxyl radical is preferably 2,2,6,6-tetramethylpiperidine-1-oxyl (TEMPO) or a derivative thereof. A preferred TEMPO derivative to be used is 4-hydroxy-2,2,6,6-tetramethylpiperidine-1-oxyl.

From the perspective of availability, the compound (C) is preferably the compound containing a conjugated double bond and containing two or more hydroxyl groups bonded to a carbon atom constituting the conjugated double bond, a salt thereof, or an oxide thereof (C1); or the alkoxyphenol (C2) and more preferably the compound containing a conjugated double bond and containing two or more hydroxyl groups bonded to a carbon atom constituting the conjugated double bond, a salt thereof, or an oxide thereof (C1).

[Applications]

The composition (D) of the present invention is used for various applications. The following description gives some examples although the applications are not limited to these examples.

(1) Application for dispersant: a dispersion stabilizer for an organic or inorganic pigment, such as a paint and an adhesive; and a dispersion stabilizer and a dispersing aid for suspension polymerization of various vinyl compounds, such as vinyl chloride, vinylidene chloride, styrene, (meth)acrylate, and vinyl acetate.

(2) Application for covering agent: a paper coating agent, a sizing agent, a fiber treatment agent, a leather finishing agent, a paint, an anti-fogging agent, a metal corrosion inhibitor, a brightening agent for zinc plating, and an antistatic agent.

(3) Application for adhesive: an adhesive, a sticking agent, a remoistening adhesive, various binders, and an additive for cement and mortar.

(4) Application for emulsifier: an emulsifier for emulsion polymerization, and a post-emulsifier such as bitumen.

(5) Application for flocculant: a flocculant for aquatic suspended matter and dissolved matter, and a metal flocculant.
(6) Application for paper processing: a paper strengthening agent, an oil-resistance/solvent-resistance imparting agent, a smoothness improver, a surface gloss improving aid, an extender, a barrier agent, a light-resistance imparting agent, a water resistant additive, a dye/developer dispersant, an adhesion improver and a binder.
(7) Application for agriculture: a binder for an agrochemical binder, an agrochemical spreader, an agrichemical coating, a soil conditioner, an anti-erosion agent and an agrochemical dispersant.
(8) Application for medicines and cosmetics: a granulating binder, a coating agent, an emulsifier, a patch, a bonding agent, a film preparation substrate and a film-forming agent.
(9) Application for viscosity modifier: a thickener and a rheology modifier.
(10) Application for film: a water-soluble film, a polarizing film, a barrier film, a film for wrapping a textile product, a seed-growing sheet, a vegetation sheet, a seed tape, and a hygroscopic film.
(11) Application for shaped article: a fiber, a pipe, a tube, a leakage prevention film, a water-soluble fiber for chemical lace, and a sponge.
(12) Application for gel: a medical and pharmaceutical gel, and an industrial gel.
(13) Application for post-reaction: post-reaction with a low-molecular organic compound, a high molecular weight organic compound and an inorganic compound.

Among them, the composition (D) of the present invention is preferably used for the (1) application for dispersant, as described later.

[Dispersion Stabilizer for Suspension Polymerization of Vinyl Compound]

Among all, a preferred application of the composition (D) of the present invention is a dispersion stabilizer for suspension polymerization of a vinyl compound containing the composition (D). Due to the excellent stability in aqueous solution, use of the composition (D) of the present invention as a dispersion stabilizer in suspension polymerization of a vinyl compound allows stable polymerization reaction and formation of fewer coarse particles. Use of the composition (D) also allows suppression of formation of fish eyes in a vinyl-based resin to be obtained.

The dispersion stabilizer for suspension polymerization may contain various additives without impairing the spirit of the present invention. Examples of the additives may include: polymerization modifiers, such as aldehydes, halogenated hydrocarbons, and mercaptans; polymerization inhibitors, such as phenolic compounds, sulfur compounds, and N-oxide compounds; pH adjusting agents; crosslinkers; antiseptics; antifungal agents; antiblocking agents; defoamers; compatibilizers; and the like. In the dispersion stabilizer for suspension polymerization, the content of the various additives is preferably 10 mass % or less based on the total amount of the composition (D) and more preferably 5 mass or less.

[Method of Producing Vinyl-Based Resin]

A preferred embodiment of the present invention is a method of producing a vinyl-based resin comprising suspension-polymerizing a vinyl compound in the presence of the composition (D) of the present invention. In addition, another preferred embodiment of the present invention is a method of producing a vinyl-based resin comprising suspension-polymerizing a vinyl compound using polyvinyl alcohol (F) having a viscosity-average degree of polymerization of 1500 or more and 3500 or less and a degree of saponification of 78 mol % or more and less than 92 mol % together with the presence of the composition (D) of the present invention. The polyvinyl alcohol (F) having a degree of polymerization and a degree of saponification in the above ranges is preferred because of the high polymerization stability. It is possible to appropriately adjust a method of producing the polyvinyl alcohol (F) in accordance with the method of producing the PVA (E). The amount of the polyvinyl alcohol (F) to be used is preferably from 10 to 1000 mass % based on the total amount of the composition (D).

Examples of the vinyl compound to be used in the method of producing a vinyl-based resin of the present invention may include: vinyl halides, such as vinyl chloride; vinyl esters, such as vinyl acetate and vinyl propionate; acrylic acid, methacrylic acid, esters and salts thereof; maleic acid, fumaric acid, esters and anhydrides thereof; styrene; acrylonitrile; vinylidene chloride; vinyl ether; and the like. Among them, it is preferred to use vinyl chloride singly or use vinyl chloride together with a monomer copolymerizable with vinyl chloride. Examples of the monomer copolymerizable with vinyl chloride may include: vinyl esters, such as vinyl acetate and vinyl propionate; (meth)acrylic esters, such as methyl (meth)acrylate and ethyl (meth) acrylate; α-olefins, such as ethylene and propylene; unsaturated dicarboxylic acids, such as maleic anhydride and itaconic acid; acrylonitrile; styrene; vinylidene chloride; vinyl ether; and the like.

For the suspension polymerization of the vinyl compound, an oil or water-soluble polymerization initiator may be used that has been conventionally used for polymerization of vinyl chloride. Examples of the oil soluble polymerization initiator may include: percarbonate compounds, such as diisopropyl peroxydicarbonate, di-2-ethylhexyl peroxydicarbonate, and diethoxyethyl peroxydicarbonate; perester compounds, such as t-butyl peroxyneodecanoate, t-butyl peroxypivalate, t-hexyl peroxypivalate, and a-cumyl peroxyneodecanoate; peroxides, such as acetylcyclohexylsulfonyl peroxide, 2,4,4-trimethylpentyl-2-peroxyphenoxyacetate, 3,5,5-trimethylhexanoyl peroxide, and lauroyl peroxide; azo compounds, such as azobis-2,4-dimethylvaleronitrile and azobis(4-2,4-dimethylvaleronitrile); and the like. Examples of the water-soluble polymerization initiator may include potassium persulfate, ammonium persulfate, hydrogen peroxide, cumene hydroperoxide, and the like. One type of the polymerization initiators may be used singly or two or more may be used together.

In suspension polymerization of the vinyl compound, the polymerization temperature is not particularly limited, and may be at approximately 20° C. or may be more than 90° C. To increase heat removal efficiency of the polymerization reaction system, a polymerizer with a reflux condenser may be used.

For suspension polymerization of the vinyl compound, it is allowed to use the composition (D) together with: water soluble cellulose ethers, such as methyl cellulose, hydroxyethyl cellulose, hydroxypropyl cellulose, and hydroxypropyl methyl cellulose; water soluble polymers, such as gelatin; oil soluble emulsifiers, such as sorbitan monolaurate, sorbitan trioleate, glycerin tristearate, and ethylene oxide-propylene oxide block copolymers; water soluble emulsifiers, such as polyoxyethylene sorbitan monolaurate, polyoxyethylene glycerin oleate, and sodium laurate; and the like, which are generally used for suspension polymerization of the vinyl compound in an aqueous medium. They are preferably added in an amount of, but not particularly limited to, 0.01 part by mass or more and 1.0 part by mass or less based on 100 parts by mass of the vinyl compound.

EXAMPLES

The present invention is described more in detail below with reference to Examples. In Examples and Comparative Examples below, "part" and "%" denote part by mass and mass %, respectively, unless otherwise specified.

[Viscosity-Average Degree of Polymerization of PVA]

The viscosity-average degree of polymerization of the PVA was measured in accordance with JIS-K6726: 1994. Specifically, a viscosity-average degree of polymerization (P) was obtained for the PVA, which was saponified to have a degree of saponification of 99.5 mol % or more if the degree of saponification was less than 99.5 mol %, by an equation below using the limiting viscosity [η] (liter/g) measured at 30° C. in water. The degree of saponification of the modified PVA (A) was a value obtained by measuring the modified PVA (A) produced by purification by reprecipitation and isolation of powder of the obtained composition (D).

$$P = ([\eta] \times 10^4 / 8.29)^{(1/0.62)}$$

[Degree of Saponification of PVA]

The degree of saponification of the PVA was obtained by the method in accordance with JIS-K6726: 1994. The degree of saponification of the modified PVA (A) was a value obtained by measuring the modified PVA (A) produced by purification by reprecipitation and isolation of powder of the obtained composition (D).

[Amount of Introduced Modification Groups in Modified PVA (A)]

A 10% aqueous solution of the composition (D) was prepared. Into 500 g of a solution of methyl acetate/water=95/5, 5 g of this aqueous solution was dropped to precipitate the modified PVA (A) for recovery and drying. The isolated modified PVA (A) was subjected to measurement of the amount of double bonds introduced into the modified PVA (A) using $^1$H-NMR to obtain the amount of introduced modification groups. The amount of double bonds is the number of moles of the double bonds relative to the total monomer units in the modified PVA (A).

[Water Insoluble Content in Aqueous Solution of Composition (D)]

After 100 g of a 4% aqueous solution of the composition (D) was prepared, the total amount was filtered through a 200-mesh wire gauze (where the mass of the wire gauze before filtration was a [g]) and dried at 105° C. for 3 hours together with the wire gauze (where the total mass of the wire gauze and the substance remained on the wire gauze after drying was b [g]). The water insoluble content (ppm) was obtained using an equation below.

Water Insoluble Content (ppm)=1000000×(b−a)/4

Production of Composition 1

A solution was prepared in which 5.5 parts of methacrylic anhydride as the esterification agent and 0.3 part of t-butylhydroquinone as the compound (C) were dissolved in methyl acetate to have an esterification agent concentration of 40%, and 100 parts of PVA having a viscosity-average degree of polymerization of 800 and a degree of saponification of 72 mol % as the PVA (E) was added and vacuum dried at a temperature of 20° C. to remove the solvent. Then, after heat treatment at a temperature of 120° C. for 6 hours, 1.5 parts of methacrylic acid was added as the unsaturated monocarboxylic acid or a salt thereof (B) to obtain a powder composition 1 containing the modified PVA (A) with a methacryloyl group introduced thereto, the unsaturated monocarboxylic acid or a salt thereof (B), and the compound (C). The amount of the unsaturated monocarboxylic acid or a salt thereof (B) used above is an amount based on 100 parts of the modified PVA (A). In the modified PVA (A), a peak of the introduced double bonds was found in the region from 6.0 to 6.5 ppm and the amount of introduced modification groups was 0.21 mol % relative to the total monomer units. The modified PVA (A) had a viscosity-average degree of polymerization of 800 and a degree of saponification of 72 mol %. In the composition 1, the mass ratio of the modified PVA (A)/unsaturated monocarboxylic acid or a salt thereof (B) was 98.5/1.5.

Production of Compositions 2 through 13

Compositions 2 through 13 were produced in the same manner as the production of the composition 1 except for respectively changing the types, amounts, and heat treatment conditions of the PVA (E), the esterification agent, the compound (C), and the unsaturated monocarboxylic acid or a salt thereof (B) as shown in Tables 1 and 2. The conditions and the results are shown in Tables 1 and 2.

TABLE 1

| | Synthesis of Modified PVA (A) | | | | | | |
|---|---|---|---|---|---|---|---|
| | PVA (E) | | Esterification Agent | | Compound (C) | | Heat Treatment |
| | Viscosity-Average Degree of Polymerization | Degree of Saponification (mol %) | Type | Amount of Use (parts)[1] | Type | Amount of Use (parts)[1] | Conditions Temperature (° C.) |
| PVA (A1) | 800 | 72 | Methacrylic Anhydride | 5.5 | t-Butylhydroquinone | 0.3 | 120 |
| PVA (A2) | 1700 | 88 | Acrylic Anhydride | 9 | Methoxyphenol | 0.5 | 120 |
| PVA (A3) | 800 | 72 | Acrylic Anhydride | 4.5 | Ascorbic Acid | 3 | 120 |
| PVA (A4) | 800 | 72 | Methacrylic Anhydride | 1.6 | — | — | 120 |
| PVA (A5) | 800 | 72 | Methacrylic Anhydride | 35 | t-Butylhydroquinone | 1 | 120 |

TABLE 1-continued

| | | | | | | | |
|---|---|---|---|---|---|---|---|
| PVA (A6) | 300 | 98 | Acrylic Anhydride | 4.5 | t-Butylhydroquinone | 0.3 | 120 |
| PVA (A7) | 2000 | 65 | Acrylic Anhydride | 4.5 | t-Butylhydroquinone | 0.3 | 120 |
| PVA (A8) | 800 | 72 | — | — | t-Butylhydroquinone | 0.3 | 120 |
| PVA (A9) | 800 | 72 | Monomethyl Maleate | 2 | t-Butylhydroquinone | 0.3 | 120 |
| PVA (A10) | 800 | 72 | Methacrylic Anhydride | 40 | t-Butylhydroquinone | 0.3 | 135 |

| | Synthesis of Modified PVA (A) Heat Treatment Conditions Time (hr) | Evaluation Results of Modified PVA (A) | | | |
|---|---|---|---|---|---|
| | | Viscosity-Average Degree of Polymerization | Degree of Saponification (mol %) | Introduced Modification Group | Amount of Introduced Modification Groups (mol %) |
| PVA (A1) | 6 | 800 | 72 | Methacryloyl Group | 0.21 |
| PVA (A2) | 6 | 1700 | 88 | Acryloyl Group | 0.41 |
| PVA (A3) | 6 | 800 | 72 | Acryloyl Group | 0.21 |
| PVA (A4) | 4 | 800 | 72 | Methacryloyl Group | 0.05 |
| PVA (A5) | 4 | 800 | 72 | Methacryloyl Group | 1.1 |
| PVA (A6) | 6 | 300 | 98 | Acryloyl Group | 0.21 |
| PVA (A7) | 6 | 2000 | 65 | Acryloyl Group | 0.20 |
| PVA (A8) | 6 | 800 | 72 | — | — |
| PVA (A9) | 4 | 800 | 72 | Maleinyl Group | 0.32 |
| PVA (A10) | 6 | 800 | 72 | Methacryloyl Group | 2.23 |

[1] Amount of use (parts) based on 100 parts of PVA (E)

Example 1

The composition 1 thus obtained was left, after production, at 20° C. for 5 days and then used to prepare a 4% aqueous solution, and in the method described earlier, the water insoluble content (hereinafter, may be referred to as a "water insoluble content (P)") was measured to be 5 ppm. The composition 1 was also left, after production, at 50° C. for 6 months and then the water insoluble content (hereinafter, may be referred to as a "water insoluble content (Q)") was measured in the same manner to be 5 ppm. The increase ratio (Q/P) in the water insoluble content, Water Insoluble Content (Q)/Water Insoluble Content (P), was 1.0.

The composition 1 left at 50° C. for 6 months after production was dissolved in deionized water as the dispersion stabilizer for suspension polymerization and 100 parts of the solution was charged into an autoclave. The concentration of the composition 1 in the aqueous solution was 400 ppm relative to the amount of charged vinyl chloride. Then, deionized water was additionally charged to have the total deionized water to be 1200 parts. Then, 0.65 parts of a 70% toluene solution of cumyl peroxyneodecanoate and 1.05 parts of a 70% toluene solution of t-butyl peroxyneododecanoate were charged into an autoclave and nitrogen was introduced into the autoclave to allow the pressure to be 0.2 MPa. After that, operation of nitrogen purge was performed 5 times in total to sufficiently purge inside the autoclave by nitrogen for removal oxygen, followed by charging of 940 parts of vinyl chloride. The contents in the autoclave were subjected to a temperature rise to 57° C. and suspension polymerization of vinyl chloride was initiated under stirring. The pressure in the autoclave was 0.80 MPa when the polymerization was initiated. Approximately 3.5 hours after initiating the polymerization, the polymerization was terminated when the pressure in the autoclave reached 0.70 MPa and unreacted vinyl chloride was removed. The polymerization reaction product was then taken out and dried at 65° C. for 16 hours to obtain vinyl chloride polymer particles.

Evaluation of Vinyl Chloride Polymer Particles

The vinyl chloride polymer particles thus obtained were evaluated for (1) average particle diameter, (2) particle size distribution, and (3) fish eyes in accordance with the following methods. The evaluation results are shown in Table 2.

(1) Average Particle Diameter

The particle size distribution was measured by dry sieving in accordance with JIS-Z8815: 1994 using a Tyler-mesh wire gauze. The average particle diameter was calculated from the results using Rosin-Rammler plot.

(2) Particle Size Distribution

A content of JIS standard screen 42-mesh on was expressed as mass %.
A: less than 0.5%
B: 0.5% or more and less than 1%
C: 1% or more A content of JIS standard screen 60-mesh on was expressed as mass %.
A: less than 5%
B: 5% or more and less than 10%
C: 10% or more In both contents of 42-mesh on and 60-mesh on, a smaller value indicates fewer coarse particles, a narrower particle size distribution, and excellent polymerization stability.

(3) Fish Eyes

A sheet with a thickness of 0.1 mm was prepared by roll milling 100 parts of the vinyl chloride polymer particles thus obtained, 50 parts of DOP (dioctyl phthalate), 5 parts of tribasic lead sulphate, and 1 part of zinc stearate at 150° C. for 7 minutes to measure the number of fish eyes per 1000 $cm^2$.

Examples 2 through 5

Using the compositions 2 through 5 thus obtained, the water insoluble content was measured in the same manner as in Example 1. Both the water insoluble content (P) and the water insoluble content (Q) were 1000 ppm or less and the increase ratio (Q/P) in the water insoluble content was 5 or less, resulting in high stability of the aqueous solution. The results are shown in Table 2.

Suspension polymerization of vinyl chloride was performed in the same manner as in Example 1 except for changing the composition (D) as shown in Table 2, and in Example 2, further using PVA other than the modified PVA (A) together. The conditions and evaluation results of the vinyl chloride polymer particles thus obtained are shown in Table 2.

Comparative Example 1

The water insoluble contents were measured in the same manner as in Example 1 using the composition 6 thus obtained. Since the unsaturated monocarboxylic acid or a salt thereof (B) is not contained in the composition 6, the water insoluble content (Q) after leaving at 50° C. for 6 months after production and the increase ratio (Q/P) in the water insoluble content were very high, resulting in low stability of the aqueous solution. Use of the composition 6 for suspension polymerization of the vinyl compound caused a large particle diameter and a wide particle size distribution of the vinyl chloride polymer particles and formation of more fish eyes. The conditions and the results are shown in Table 2.

Comparative Example 2

The water insoluble contents were measured in the same manner as in Example 1 using the composition 7 thus obtained. Since the unsaturated monocarboxylic acid or a salt thereof (B) contained in the composition 7 was oleic acid, the aqueous solution was opaque and low in water solubility. Use of the composition 7 for suspension polymerization of the vinyl compound caused a large particle diameter and a wide particle size distribution of the vinyl chloride polymer particles and formation of more fish eyes. The conditions and the results are shown in Table 2.

Comparative Example 3

The water insoluble contents were measured in the same manner as in Example 1 using the composition 8 thus obtained. The values of the amount of the water insoluble content and the increase ratio (Q/P) in the water insoluble content were not unfavorable. However, since the degree of polymerization of the modified PVA (A) contained in the composition 8 was too low, use of the composition 8 for suspension polymerization of the vinyl compound caused a large particle diameter and a wide particle size distribution of the vinyl chloride polymer particles and formation of more fish eyes. The conditions and the results are shown in Table 2.

Comparative Example 4

The water insoluble contents were measured in the same manner as in Example 1 using the composition 9 thus obtained. Since the degree of saponification of the modified PVA (A) contained in the composition 9 was too low, the composition 9 was not soluble in water. Use of the composition 9 for suspension polymerization of the vinyl compound caused a large particle diameter and a wide particle size distribution of the vinyl chloride polymer particles and formation of more fish eyes. Since the composition 9 was not soluble in water, the composition 9 in powder form was directly used for suspension polymerization of the vinyl compound. The conditions and the results are shown in Table 2.

Comparative Example 5

The water insoluble contents were measured in the same manner as in Example 1 using the composition 10 thus obtained. The values of the amount of the water insoluble content and the increase ratio (Q/P) in the water insoluble content were not unfavorable. However, since the modified PVA (A) was not contained in the composition 10, use of the composition 10 for suspension polymerization of the vinyl compound caused a large particle diameter and a wide particle size distribution of the vinyl chloride polymer particles and formation of more fish eyes. The conditions and the results are shown in Table 2.

Comparative Example 6

The water insoluble contents were measured in the same manner as in Example 1 using the composition 11 thus obtained. The values of the amount of the water insoluble content and the increase ratio (Q/P) in the water insoluble content were not unfavorable. However, since the side chain of the modified PVA (A) contained in the composition 11 was a maleinyl group, use of the composition 11 for suspension polymerization of the vinyl compound caused a large particle diameter and a wide particle size distribution of the vinyl chloride polymer particles and formation of more fish eyes. The conditions and the results are shown in Table 2.

Comparative Example 7

The water insoluble contents were measured in the same manner as in Example 1 using the composition 12 thus obtained. Since the unsaturated monocarboxylic acid or a salt thereof (B) contained in the composition 12 was too much, the water insoluble content (Q) and the increase ratio (Q/P) in the water insoluble content were high. Use of the composition 12 for suspension polymerization of the vinyl compound caused a large particle diameter and a wide particle size distribution of the vinyl chloride polymer particles and formation of more fish eyes. The conditions and the results are shown in Table 2.

Comparative Example 8

The water insoluble contents were measured in the same manner as in Example 1 using the composition 13 thus obtained. Since the modified amount of the modified PVA (A) contained in the composition 13 was too much, the water insoluble content was high. Use of the composition 13 for suspension polymerization of the vinyl compound caused a large particle diameter and a wide particle size distribution of the vinyl chloride polymer particles and formation of more fish eyes. The conditions and the results are shown in Table 2.

TABLE 2

| | | Composition (D) | | | | | | |
|---|---|---|---|---|---|---|---|---|
| | | Modified PVA (A) | Unsaturated Monocarboxylic Acid or Salt thereof (B) | Amount of Use (part)[1)] | Mass Ratio (A)/(B) | Water Insoluble Content (P) (ppm) | Water Insoluble Content (Q) (ppm) | Rate of Increase (Q/P) |
| Example 1 | Composition 1 | PVA (A1) | Methacrylic Acid | 1.5 | 98.5/1.5 | 5 | 5 | 1.0 |
| Example 2 | Composition 2 | PVA (A2) | Sodium Acrylate | 2 | 98/2 | 100 | 450 | 4.5 |
| Example 3 | Composition 3 | PVA (A3) | Sodium Methacrylate | 3.5 | 96.6/3.4 | 30 | 140 | 4.7 |
| Example 4 | Composition 4 | PVA (A4) | Sodium Acrylate | 2 | 98/2 | 90 | 370 | 4.1 |
| Example 5 | Composition 5 | PVA (A5) | Methacrylic Acid | 1.5 | 98.5/1.5 | 200 | 600 | 3.0 |
| Comparative Example 1 | Composition 6 | PVA (A2) | — | — | — | 60 | 2500 | 41.7 |
| Comparative Example 2 | Composition 7 | PVA (A1) | Oleic Acid | 5 | 95.2/4.8 | Opaque | Opaque | — |
| Comparative Example 3 | Composition 8 | PVA (A6) | Methacrylic Acid | 1.5 | 98.5/1.5 | 10 | 40 | 4.0 |
| Comparative Example 4 | Composition 9 | PVA (A7) | Methacrylic Acid | 1.5 | 98.5/1.5 | Insoluble | Insoluble | — |
| Comparative Example 5 | Composition 10 | PVA (A8) | Methacrylic Acid | 1.5 | 98.5/1.5 | 5 | 5 | 1.0 |
| Comparative Example 6 | Composition 11 | PVA (A9) | Methacrylic Acid | 1.5 | 98.5/1.5 | 10 | 25 | 2.5 |
| Comparative Example 7 | Composition 12 | PVA (A2) | Methacrylic Acid | 28 | 78.1/21.9 | 50 | 4000 | 80 |
| Comparative Example 8 | Composition 13 | PVA (A10) | Methacrylic Acid | 1.5 | 98.5/1.5 | 10000 | 32000 | 3.2 |

| | Suspension Polymerization Evaluation of Vinyl Compound after Leaving at 50° C. for 6 Months after Production | | | | | | |
|---|---|---|---|---|---|---|---|
| | Dispersion Stabilizer for Suspension Polymerization | | | | | | |
| | Amount of Charged Composition (D) (ppm/ Vinyl Chloride) | PVA Used together | | Evaluation Results of Vinyl Chloride Polymer Particles | | | |
| | | PVA[2)] | Amount of Charged PVA (ppm/ Vinyl Chloride) | Average Particle Diameter (μm) | Particle Size Distribution | | Fish Eye (number) |
| | | | | | 42-mesh on | 60-mesh on | |
| Example 1 | 400 | — | — | 148.5 | A | A | 0 |
| Example 2 | 400 | Degree of Polymerization of 800, Degree of Saponification of 72 mol % | 400 | 169.6 | A | A | 37 |
| Example 3 | 400 | — | — | 166.2 | A | A | 9 |
| Example 4 | 400 | — | — | 169.7 | A | A | 18 |
| Example 5 | 400 | — | — | 148.1 | A | A | 30 |
| Comparative Example 1 | 400 | Degree of Polymerization of 800. Degree of Saponification of 72 mol % | 400 | 194.7 | C | B | 700 |
| Comparative Example 2 | 400 | — | — | 256.1 | C | C | 10000 |
| Comparative Example 3 | 400 | — | — | 301.2 | C | C | 20000 |

TABLE 2-continued

| | | | | | | | |
|---|---|---|---|---|---|---|---|
| Comparative Example 4 | 400 | — | — | 345.8 | C | C | 25000 |
| Comparative Example 5 | 400 | — | — | 380 | C | C | 8000 |
| Comparative Example 6 | 400 | — | — | 326.9 | C | C | 6000 |
| Comparative Example 7 | 400 | Degree of Polymerization of 800, Degree of Saponification of 72 mol % | 400 | 223.4 | C | C | 1000 |
| Comparative Example 8 | 400 | — | — | 188.1 | B | C | 3000 |

[1]Amount of use (parts) based on 100 parts of modified PVA (A)
[2]Degree of polymerization of PVA was viscosity-average degree of polymerization.

As indicated in Examples, the composition (D) of the present invention was excellent in water solubility and storage stability, and particularly when used as the dispersion stabilizer for suspension polymerization of the vinyl compound, it is possible to provide a vinyl-based resin that is excellent in polymerization stability even after a long term after production, has a small average particle diameter, has fewer coarse particles produced therein, and suppresses formation of fish eyes. Accordingly, the industrial usefulness of the present invention is extremely high.

The invention claimed is:

1. A composition, comprising:
    modified polyvinyl alcohol; and
    unsaturated monocarboxylic acid or a salt thereof,
    wherein
    the modified polyvinyl alcohol has a viscosity-average degree of polymerization of from 400 to 3500, has a degree of saponification of from 68 mol % to 99.9 mol %, and comprises from 0.01 mol % to 1.50 mol % of an acryloyl group or a methacryloyl group in a side chain,
    the unsaturated monocarboxylic acid or a salt thereof is at least one selected from the group consisting of acrylic acid, methacrylic acid, sodium acrylate, and sodium methacrylate, and
    in the composition, a mass ratio of the modified polyvinyl alcohol/the unsaturated monocarboxylic acid or a salt thereof is from 82/18 to 99.9/0.1.

2. The composition of claim 1, wherein the modified polyvinyl alcohol comprises a methacryloyl group in a side chain.

3. The composition claim 1, wherein the unsaturated monocarboxylic acid or a salt thereof is methacrylic acid or sodium methacrylate.

4. The composition of claim 1, further comprising a compound being at least one selected from the group consisting of:
    a compound containing a conjugated double bond and containing two or more hydroxyl groups bonded to a carbon atom constituting the conjugated double bond, a salt thereof, or an oxide thereof;
    alkoxyphenol; and
    a cyclic nitroxyl radical.

5. A dispersion stabilizer, comprising the composition of claim 1,
    wherein the dispersion stabilizer is suitable for suspension polymerization of a vinyl compound.

6. A method of producing a vinyl-based resin, the method comprising: suspension-polymerizing a vinyl compound in the presence of the composition of claim 1.

* * * * *